United States Patent
Lai et al.

(10) Patent No.: US 11,901,754 B2
(45) Date of Patent: Feb. 13, 2024

(54) CHARGING BASE

(71) Applicant: ASUSTEK COMPUTER INC., Taipei (TW)

(72) Inventors: Chin Chung Lai, Taipei (TW); Yung-Hsiang Chen, Taipei (TW)

(73) Assignee: ASUSTEK COMPUTER INC., Taipei (TW)

( * ) Notice: Subject to any disclaimer, the term of this patent is extended or adjusted under 35 U.S.C. 154(b) by 0 days.

(21) Appl. No.: 17/585,945

(22) Filed: Jan. 27, 2022

(65) Prior Publication Data

US 2022/0285954 A1 Sep. 8, 2022

(30) Foreign Application Priority Data

Mar. 2, 2021 (CN) .......................... 202120452735.3

(51) Int. Cl.
| | |
|---|---|
| *G06F 3/039* | (2013.01) |
| *H02J 7/00* | (2006.01) |
| *H01R 13/62* | (2006.01) |
| *G06F 3/0354* | (2013.01) |
| *H01R 13/627* | (2006.01) |

(52) U.S. Cl.
CPC ........ *H02J 7/0044* (2013.01); *G06F 3/03545* (2013.01); *H01R 13/6205* (2013.01); *H01R 13/6277* (2013.01); *H01R 2201/06* (2013.01)

(58) Field of Classification Search
CPC ........ H01F 7/02; G06F 3/03545; G06F 3/039; G06F 1/1626; G06F 1/1643; G06F 2200/1632; G06F 1/169; G06F 13/4077; G06F 2213/0042; G06F 1/266; G06F 1/1656; H02J 7/0044; H01R 13/2421; H01R 13/6205; H01R 2201/06
See application file for complete search history.

(56) References Cited

U.S. PATENT DOCUMENTS

| | | | |
|---|---|---|---|
| 2008/0180411 A1* | 7/2008 | Solomon ............. | G06F 3/03545 345/179 |
| 2013/0106723 A1* | 5/2013 | Bakken ............... | G06F 3/03545 345/173 |
| 2013/0323941 A1* | 12/2013 | Zeliff .................... | H01R 11/30 439/39 |

(Continued)

FOREIGN PATENT DOCUMENTS

| | | |
|---|---|---|
| CN | 208459978 U | 2/2019 |
| CN | 110471542 A | 11/2019 |
| TW | M429898 U | 5/2012 |

*Primary Examiner* — Lunyi Lao
*Assistant Examiner* — Jarurat Suteerawongsa
(74) *Attorney, Agent, or Firm* — MUNCY, GEISSLER, OLDS & LOWE, PC

(57) ABSTRACT

The disclosure provides a charging base. The charging base is applied to electrically connect to an electronic device and charge a stylus. The charging base includes: a base, a connector, a first charging end conductive structure, and a second charging end conductive structure. The base includes a through-hole. The connector is disposed on one side of the base and is used for being electrically connected to the electronic device. The first charging end conductive structure is formed on an upper surface of the base and is electrically connected to the connector. The second charging end conductive structure is formed in the through-hole and is electrically connected to the connector.

10 Claims, 12 Drawing Sheets

(56) References Cited

U.S. PATENT DOCUMENTS

| | | | |
|---|---|---|---|
| 2014/0078116 A1* | 3/2014 | Mercea | G06F 3/03545 |
| | | | 345/179 |
| 2016/0147316 A1* | 5/2016 | Ashcraft | G06F 3/03545 |
| | | | 345/179 |
| 2019/0083881 A1* | 3/2019 | Li | A63F 13/426 |
| 2020/0201396 A1* | 6/2020 | Meng | G06F 1/1607 |
| 2020/0333894 A1* | 10/2020 | Park | B43L 27/02 |

* cited by examiner

CHARGING BASE

CROSS-REFERENCE TO RELATED APPLICATION

This application claims the priority benefit of China application serial No. 202120452735.3, filed on Mar. 2, 2021. The entirety of the above-mentioned patent application is hereby incorporated by reference herein and made a part of the specification.

BACKGROUND OF THE INVENTION

Field of the Invention

The disclosure relates to a charging base, and in particular to a charging base for a stylus.

Description of the Related Art

A conventional stylus is provided with a charging hole to be connected to an external power source for charging. During charging, the stylus needs to be connected to the external power source through a charging cable, and can usually only laid aside, which is not conducive to an access operation.

BRIEF SUMMARY OF THE INVENTION

The disclosure provides a charging base. The charging base is applied to electrically connect to an electronic device and charge a stylus. The charging base includes: a base, a connector, a first charging end conductive structure, and a second charging end conductive structure. The base includes a through-hole. The connector is disposed on one side of the base and is used for being electrically connected to the electronic device. The first charging end conductive structure is formed on an upper surface of the base and is electrically connected to the connector. The second charging end conductive structure is formed in the through-hole and is electrically connected to the connector.

The charging base of the disclosure is designed to enable a user to choose to insert the stylus upright into the charging base for charging, or insert the stylus into the charging base for charging through an opening on the body of the stylus, so as to adapt to different usage states of the user. In this way, in addition to being convenient for the user to access, the stylus can be charged, which meets different usage requirements of the user.

DETAILED DESCRIPTION OF THE EMBODIMENTS

More detailed descriptions of specific embodiments of the disclosure are provided below with reference to the schematic diagrams. The features and advantages of the disclosure are described more clearly according to the following description and claims. It should be noted that all of the accompanying drawings use very simplified forms and imprecise proportions, which are only used for assisting in conveniently and clearly explaining the objective of the embodiments of the disclosure.

Figure 1A:
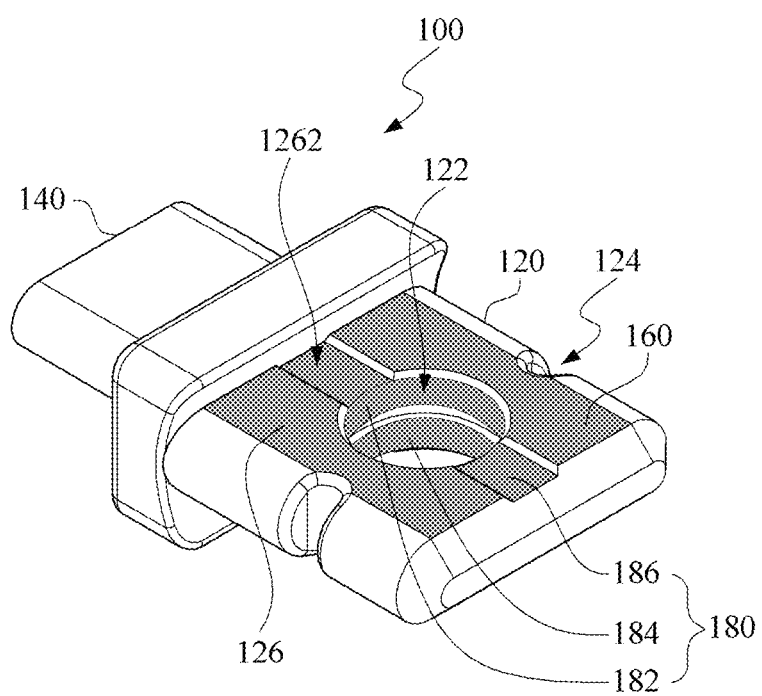
FIG. 1A is a three-dimensional schematic diagram of an embodiment of a charging base of the disclosure.
Figure 1B:
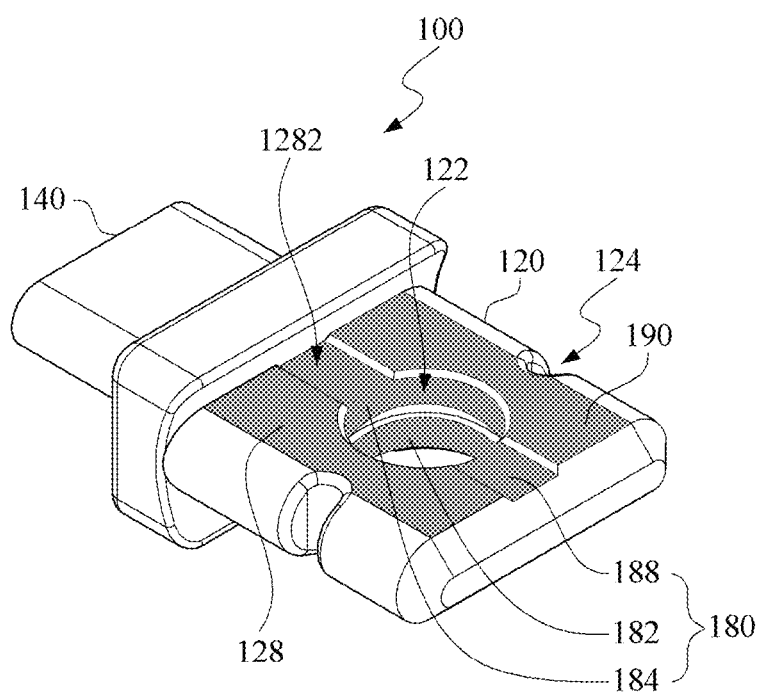
FIG. 1B is a three-dimensional schematic diagram of the charging base of FIG. 1A turned upside down.
Figure 2:
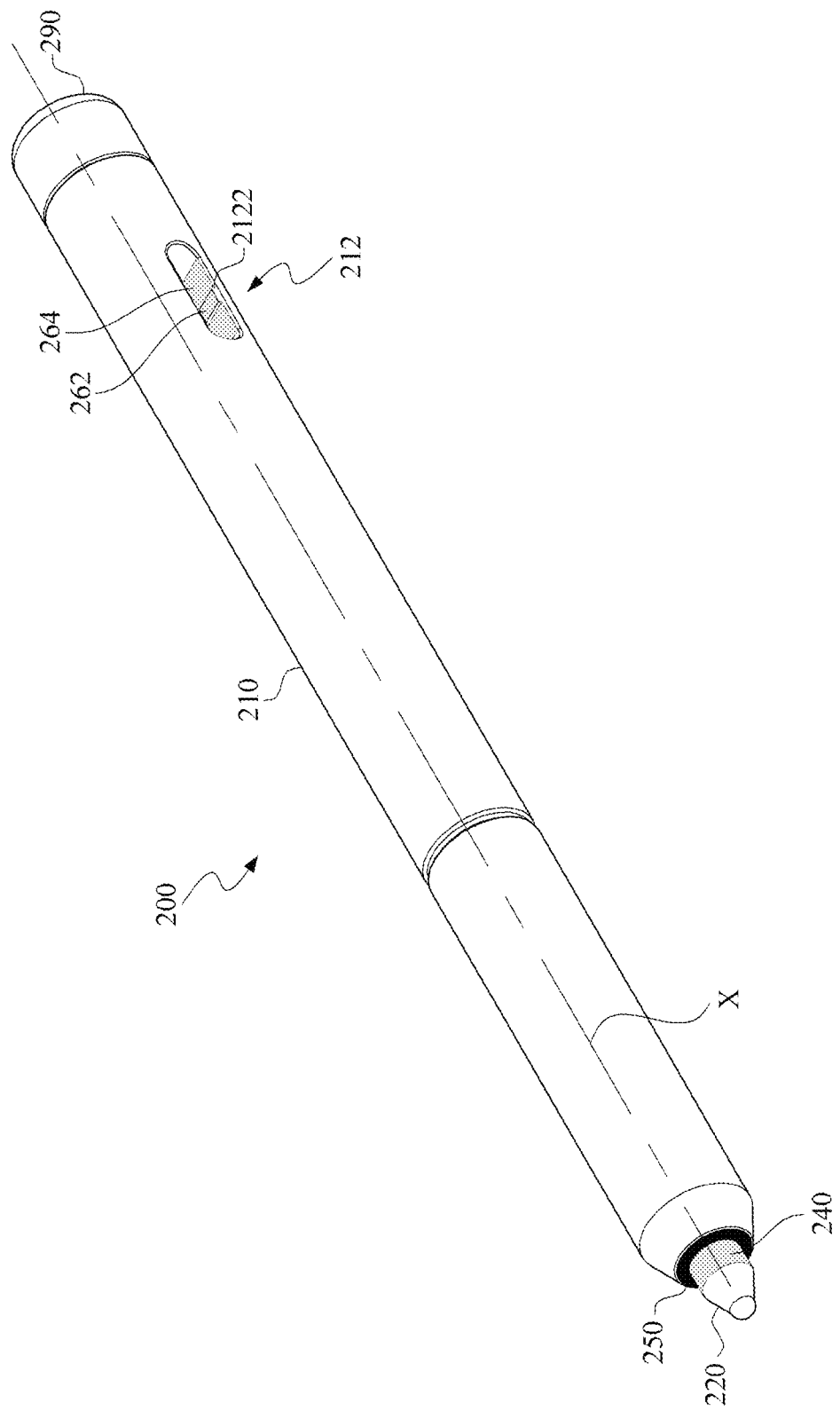
FIG. 2 is a three-dimensional schematic diagram of an embodiment of a stylus matched with the charging base shown in FIG. 1A.

FIG. 1A is a three-dimensional schematic diagram of an embodiment of a charging base of the disclosure. FIG. 1B is a three-dimensional schematic diagram of the charging base 100 of FIG. 1A turned upside down. FIG. 2 is a three-dimensional schematic diagram of an embodiment of a stylus 200 matched with the charging base 100 shown in FIG. 1A.

The charging base 100 shown in FIG. 1A and FIG. 1B is used for being installed on an electronic device such as a notebook computer, a tablet computer, or a desktop computer, and is used for charging the stylus 200 shown in FIG. 2.

As shown in FIG. 1A and FIG. 1B, the charging base 100 includes: a base 120, a connector 140, a first charging end conductive structure 160, and a second charging end conductive structure 180.

The base 120 includes a through-hole 122 to accommodate a tip 220 of the stylus 200. In an embodiment, the through-hole 122 is a circular hole. The through-hole 122 extends longitudinally through the base 120 and is approximately disposed at a middle position of the base 120.

Figure 3:
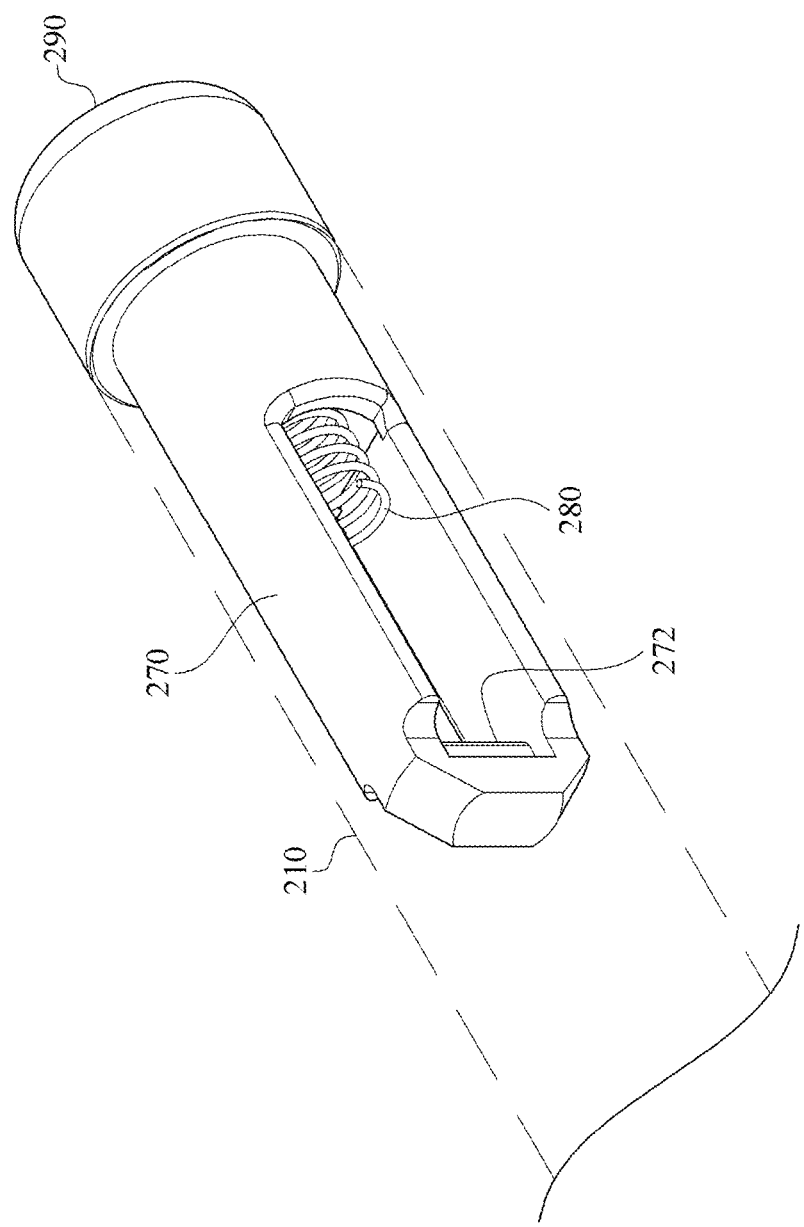
FIG. 3 is a perspective schematic diagram around an opening of the body of the stylus of FIG. 2.

In an embodiment, two opposite sides of the base 120 are each provided with a buckle groove 124, to cooperate with a clamping member 270 of the stylus 200 (referring to FIG. 3 of the disclosure). With regard to this part, more detailed descriptions are made in paragraphs corresponding to the stylus 200 below. In addition, in an embodiment, the base 120 includes a built-in magnet, to fix the stylus 200 by magnetic attraction.

The connector 140 is disposed on one side of the base 120 and is used for being electrically connected to the electronic device, to obtain power supply. In an embodiment, the connector 140 is a universal serial bus (USB) connector or another connector where power supply is obtained. In the drawing, a universal serial bus Type-C connector is taken as an example. The connector 140 allows a user to install the charging base on an electronic device for use without distinguishing forward and reverse directions of the charging base 100.

The first charging end conductive structure 160 is formed on an upper surface 126 of the base 120. The second charging end conductive structure 180 is formed in the through-hole 122. The first charging end conductive structure 160 and the second charging end conductive structure 180 are electrically connected to the connector 140, to obtain power supply.

In an embodiment, the second charging end conductive structure 180 includes at least one charging end conductive ring (such as an upper conductive ring 182 and a lower conductive ring 184 in the drawing) formed on an inner side surface of the through-hole 122. The charging end conductive ring is used for being electrically connected to a conductive structure at the tip 220 of the stylus 200. With regard to this part, more detailed descriptions are made in paragraphs corresponding to the stylus 200 below.

The first charging end conductive structure 160 and the second charging end conductive structure 180 are separated from each other. The first charging end conductive structure 160 is used as a positive electrode of the charging base 100, and the second charging end conductive structure 180 is used as a negative electrode of the charging base 100, to charge the stylus 200. However, the disclosure is not limited thereto.

In another embodiment, the first charging end conductive structure 160 is used as the negative electrode of the charging base 100 during charging. The second charging end conductive structure 180 is used as the positive electrode of the charging base 100 during charging.

In order to provide a variety of different usage manners, in an embodiment, the second charging end conductive structure 180 further includes an extending portion 186 extending from the through-hole 122 to the upper surface 126 of the base 120. The extending portion 186 and the first charging end conductive structure 160 that is located on the upper surface 126 of the base 120 are separated from each other and therefore electrically isolated from each other.

Figure 6A:
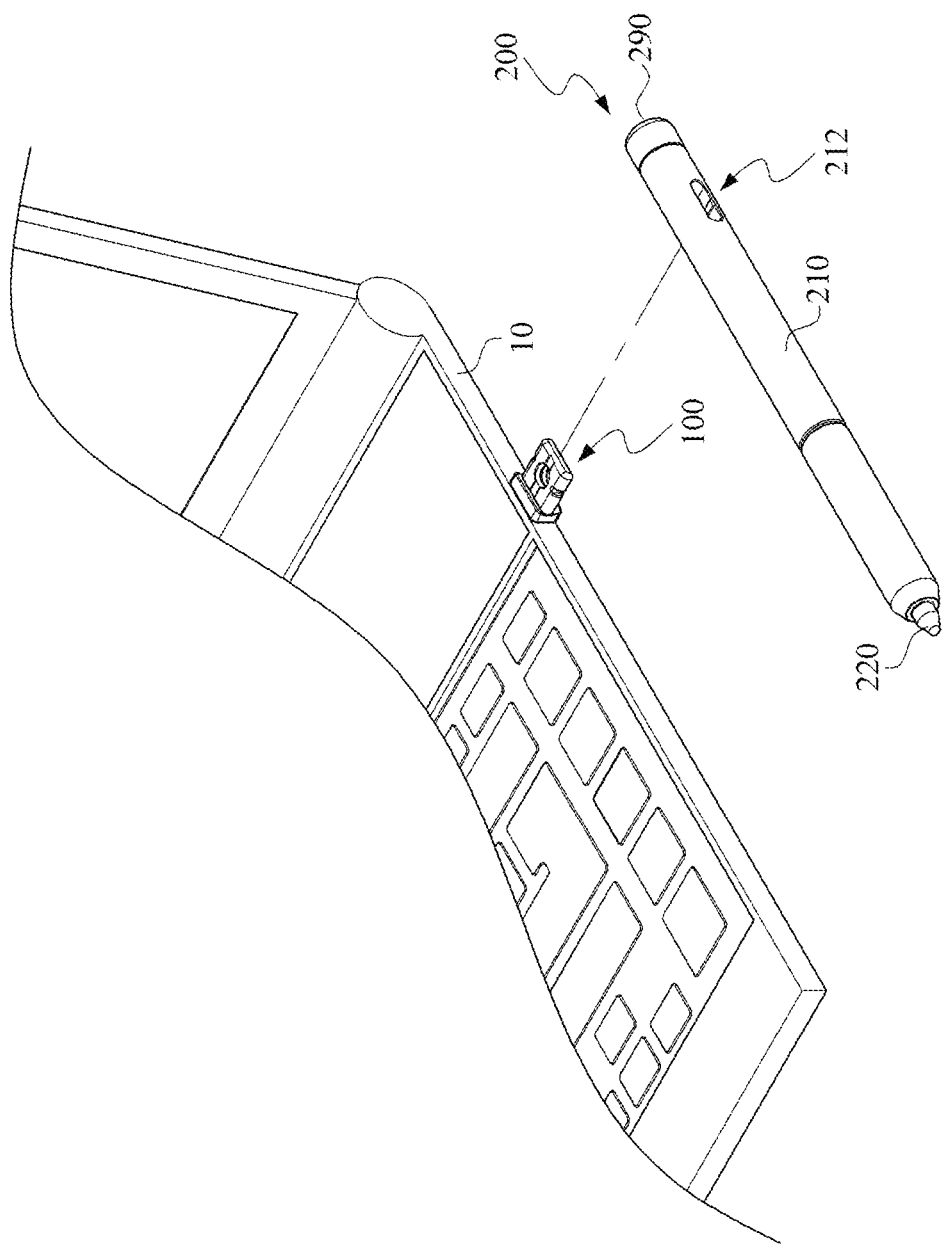
FIG. 6A to FIG. 6D show a second usage manner of the charging base of the disclosure.
Figure 6B:
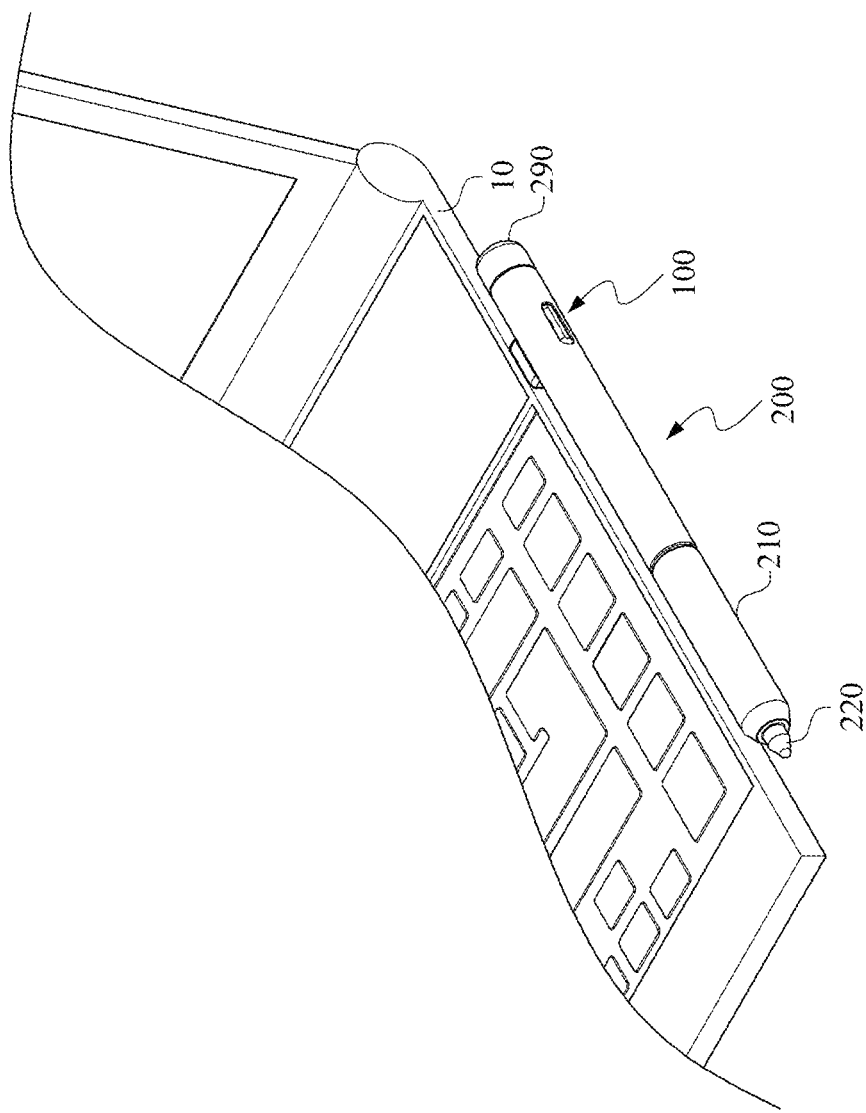
Figure 6C:
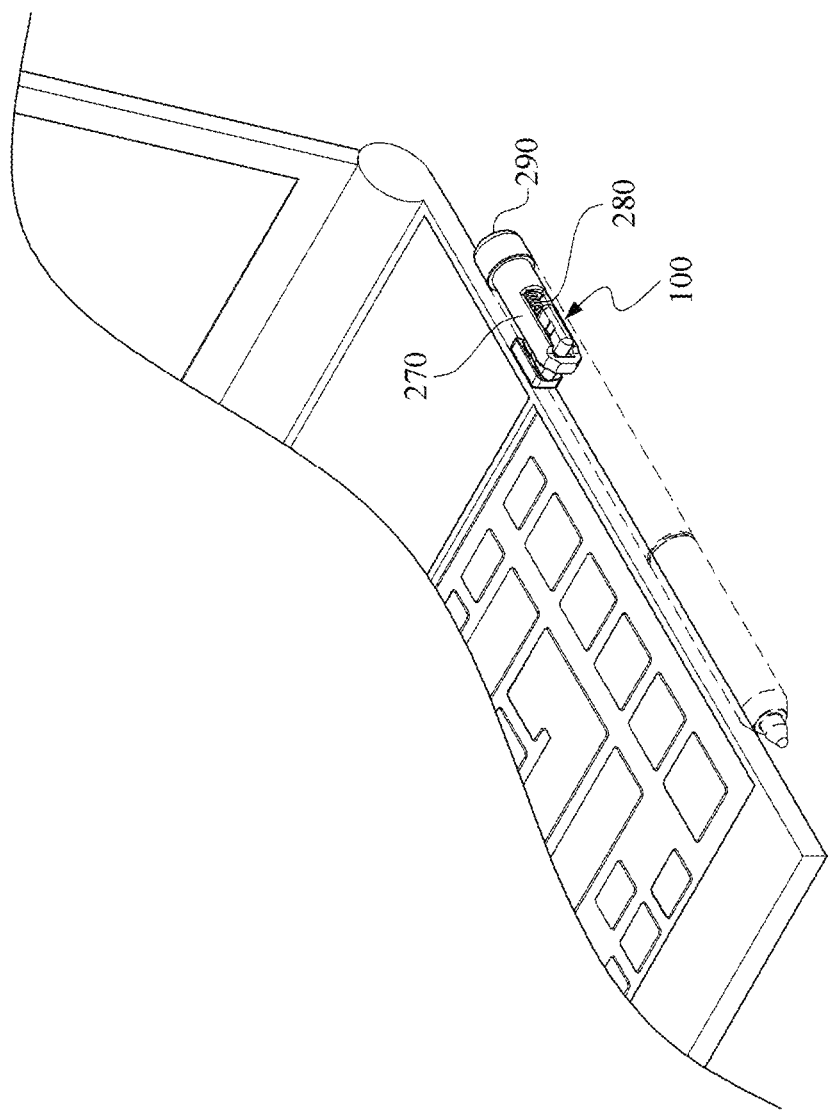
Figure 6D:
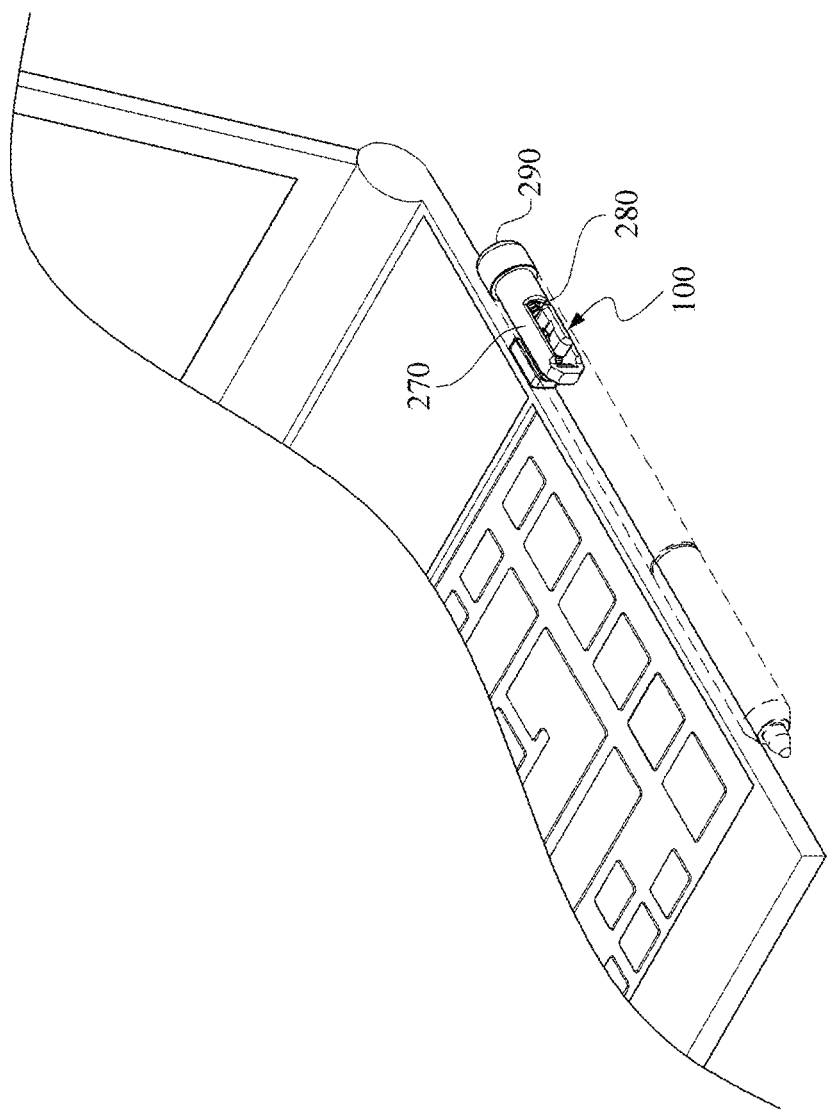

In an embodiment, the upper surface 126 of the base 120 further includes a first groove 1262. The first charging end conductive structure 160 is located on two sides of an opening of the first groove 1262. The extending portion 186 is located on a bottom surface of the first groove 1262. In this way, a negative electrode of the stylus 200 can be prevented from touching the extending portion 186 by mistake. The first groove 1262 further guides the stylus 200 to be accurately fixed at a charging position (see FIG. 6A and FIG. 6B of the disclosure for details).

Also referring to FIG. 1B, in an embodiment, in conjunction with the use of the universal serial bus Type-C connector, a conductive structure of the charging base 100 is disposed symmetrically in an up-down direction.

As shown in the drawing, the charging base 100 includes a third charging end conductive structure 190 formed on a lower surface 128 of the base 120, to match a usage state when the connector 140 is reversely installed. The third charging end conductive structure 190 is in a shape substantially the same as that of the first charging end conductive structure 160, and is separated from and therefore electrically isolated from the second charging end conductive structure 180.

During charging, the third charging end conductive structure 190 is used as the positive electrode of the charging base 100 during charging, and the second charging end conductive structure 180 is used as the negative electrode of the charging base 100 during charging, to charge the stylus 200.

Similar to the first groove 1262 on the upper surface 126 of the base 120, in an embodiment, the lower surface 128 of the base 120 includes a second groove 1282. The third charging end conductive structure 190 is located on two sides of an opening of the second groove 1282. The other extending portion 188 of the second charging end conductive structure 180 is located on a bottom surface of the second groove 1282. In this way, a negative electrode of the stylus 200 can be prevented from touching the extending portion 188 by mistake. Similar to the first groove 1262, the second groove 1282 also guides the stylus 200 to be accurately fixed at a charging position.

In an embodiment, in conjunction with the use of the universal serial bus Type-C connector, the second charging end conductive structure 180 includes the upper conductive ring 182 and the lower conductive ring 184. The upper conductive ring 182 is located on a side of the through-hole 122 close to the upper surface 126 of the base 120. The lower conductive ring 184 is located on a side of the through-hole 122 close to the lower surface 128 of the base 120. The two conductive rings, namely the first conductive ring 182 and the second conductive ring 184, abut against the conductive structure at the tip 220 of the stylus 200 when the charging base 100 is inserted in the forward and reverse directions respectively, for charging.

Also refer to FIG. 2. FIG. 2 is a three-dimensional schematic diagram of an embodiment of the stylus 200 matched with the charging base 100 shown in FIG. 1A. As shown in the drawing, the stylus 200 includes: a body 210, a tip 220, a first receiving end conductive structure 240, and a second receiving end conductive structure 250.

The tip 220 is connected to the body 210. A battery (not shown) is disposed in the body 210 to store electrical energy. The first receiving end conductive structure 240 is disposed at the tip 220 and is electrically connected to the battery.

The second receiving end conductive structure 250 is disposed at an end of the body 210 close to the tip 220 and is electrically connected to the battery. The first receiving end conductive structure 240 and the second receiving end conductive structure 250 are separated from each other and electrically isolated. The first receiving end conductive structure 240 is used as a negative electrode of the stylus 200 during charging. The second receiving end conductive structure 250 is used as a positive electrode of the stylus 200 during charging.

In an embodiment, the body 210 of the stylus 200 further includes an opening 212. The opening 212 penetrates the body 210 and is perpendicular to an axial direction X of the body 210. A third receiving end conductive structure 262 and a fourth receiving end conductive structure 264 are further disposed in the opening 212, and are each electrically connected to the battery, to serve as another charging position of the stylus 200.

The third receiving end conductive structure 262 and the fourth receiving end conductive structure 264 are separated from each other. In an embodiment, the third receiving end conductive structure 262 is used as the negative electrode of the stylus 200 during charging, and the fourth receiving end conductive structure 264 is used as the positive electrode of the stylus during charging.

The opening 212 further includes a protrusion 2122 corresponding to the first groove 1262 or the second groove 1282 of the charging base 100 shown in FIG. 1A and FIG. 1B (depending on the installation direction of the charging base 100). The third receiving end conductive structure 262 is located on an upper surface of the protrusion 2122, and is used for abutting against the extending portion 186 or the extending portion 188 in the first groove 1262 or the second groove 1282. The fourth receiving end conductive structure 264 is located on two sides of the protrusion 2122, and is used for abutting against the first charging end conductive structure 160 or the third charging end conductive structure 190 located on two sides of the opening of the first groove 1262 or the second groove 1282.

Also refer to FIG. 3. FIG. 3 is a perspective schematic diagram around the opening 212 of the body 210 of the stylus 200 of FIG. 2. As shown in the drawing, the stylus 200 further includes: a clamping member 270, a spring 280, and a cap 290.

The clamping member 270 is disposed in the body 210 and includes a buckle portion 272 that extends to one side of the opening 212 and is used for buckling with the buckle groove 124 on the base 120 of the charging base 100. The cap 290 is located at an end of the body 210 away from the tip 220 and is connected to the clamping member 270. The clamping member 270 is operated in conjunction with the cap 290. The spring 280 is disposed in the body 210. One end of the spring 280 abuts against the cap 290.

When the user inserts the opening 212 of the body 210 into the charging base 100, an acting force of the spring 280 drives the buckle portion 272 of the clamping member 270 to buckle with the buckle groove 124 on the base 120 of the charging base 100, to fix the stylus 200 to the charging base 100. When needing to remove the stylus 200, the user only needs to press the cap 290 to release the clamping member 270. For details of this operation, refer to FIG. 6A to FIG. 6D of the disclosure.

The charging base 100 provided by the disclosure allows a user to select different usage manners according to requirements of the user. These usage manners are described below.

Figure 4A:
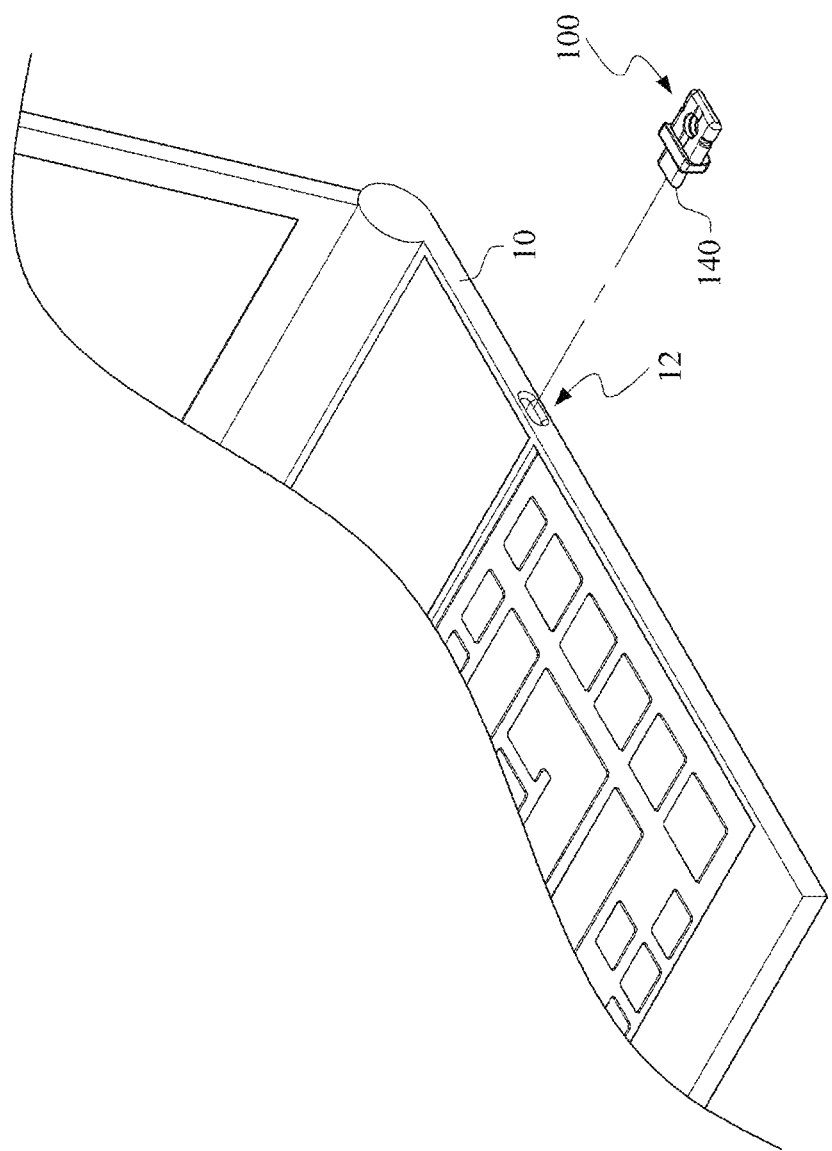
FIG. 4A and FIG. 4B show schematic diagrams of an embodiment in which the charging base of the disclosure is installed on an electronic device.
Figure 4B:
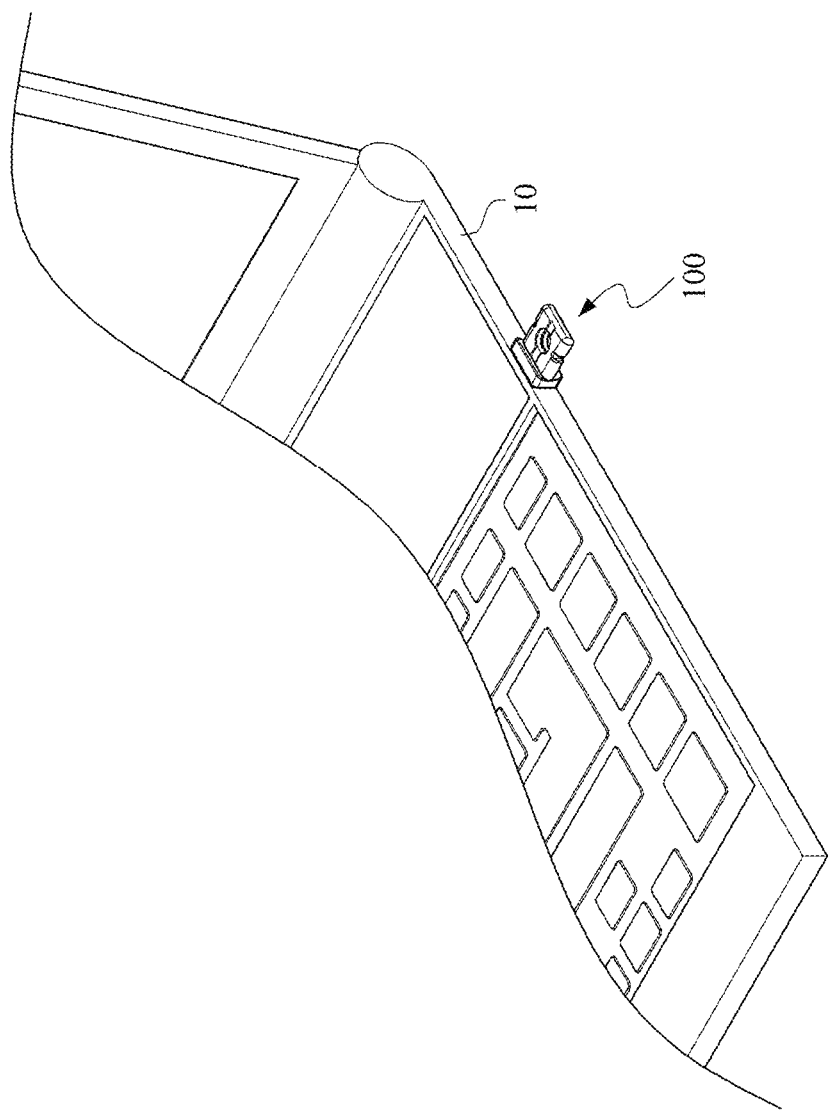

FIG. 4A and FIG. 4B show schematic diagrams of an embodiment in which the charging base 100 of the disclosure is installed on an electronic device 10. In an embodiment, the electronic device 10 is a notebook computer. The charging base 100 is installed on a main chassis part of the notebook computer. As shown in the drawing, the connector 140 of the charging base 100 is inserted into a corresponding port 12 of the electronic device 10 to obtain power supply. The base 120 of the charging base 100 is substantially in a horizontal direction.

In an embodiment, as shown in the drawing, the connector 140 is a Type-C universal serial bus (USB) connector, allowing the user to install and use the charging base 100 without distinguishing directions of the charging base.

Figure 5A:
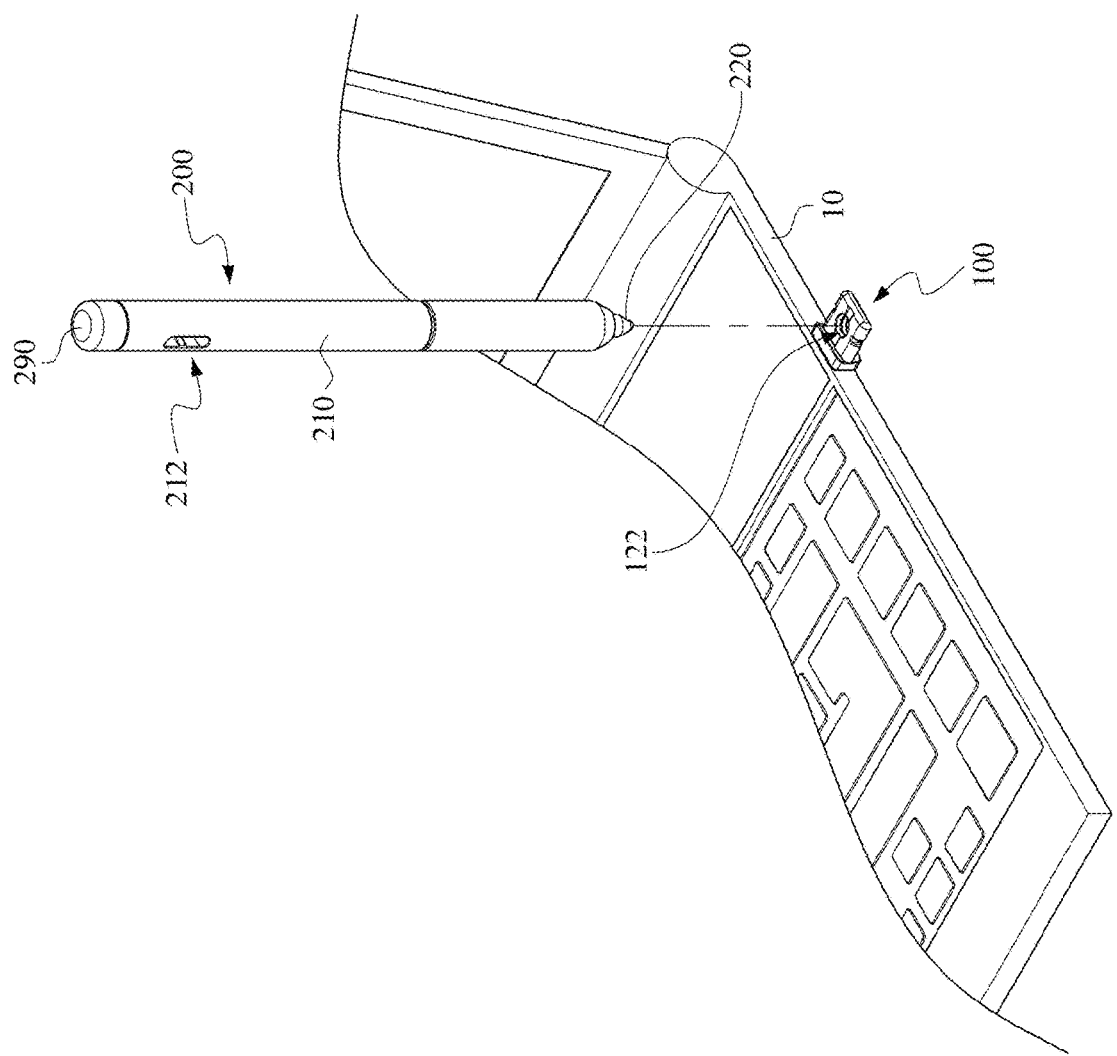
FIG. 5A and FIG. 5B show a first usage manner of the charging base of the disclosure.
Figure 5B:
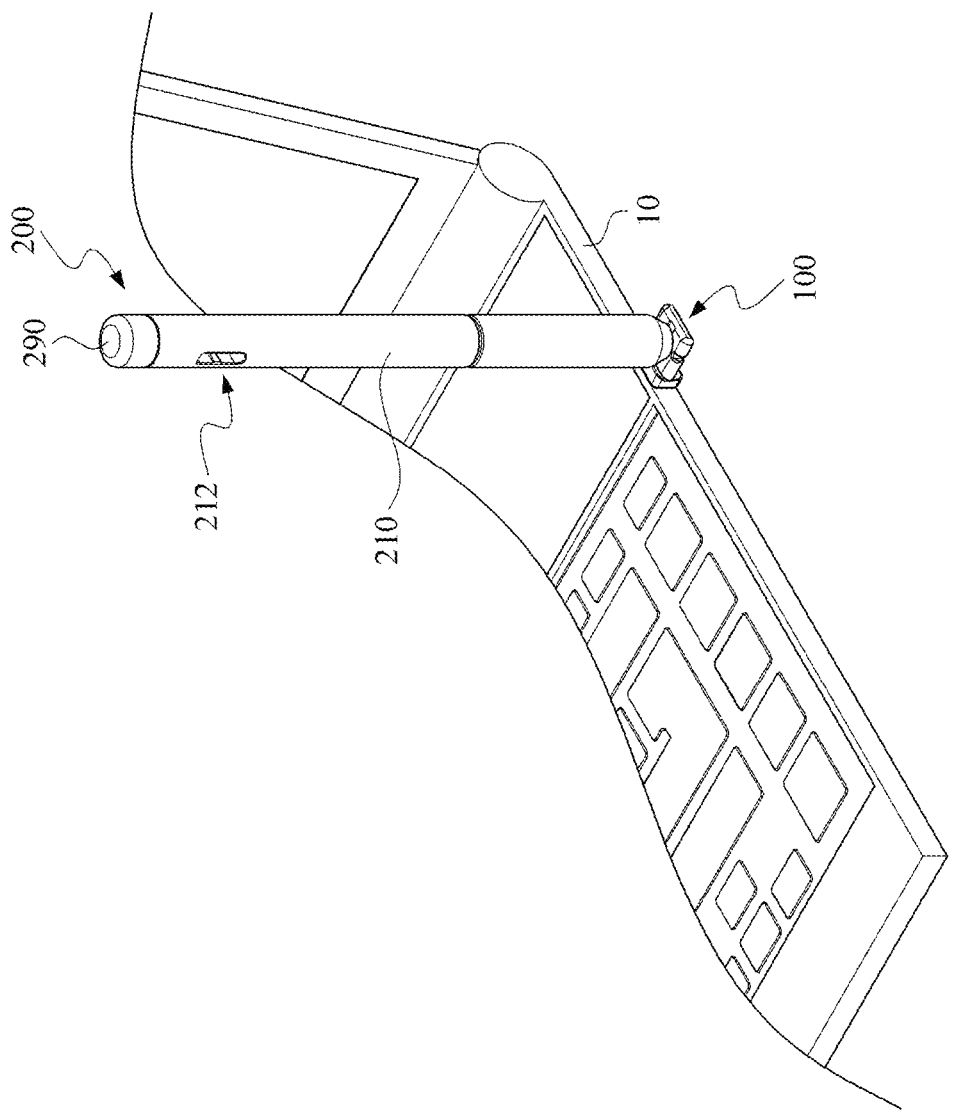

After the charging base 100 is installed on the electronic device 10, the user can select different usage manners according to requirements. FIG. 5A and FIG. 5B show a first usage manner of the charging base of the disclosure. FIG. 6A to FIG. 6D show a second usage manner of the charging base of the disclosure.

Referring to FIG. 5A and FIG. 5B, the first usage manner is to insert the stylus 200 upright into the through-hole 122 of the charging base 100, to make it convenient for the user to access the stylus 200 at any time, and allow the user to charge the stylus 200 in real time during use of the stylus 200, so that the stylus 200 is kept in a charged state.

Also refer to FIG. 1A, FIG. 1B, and FIG. 2. When the stylus 200 is inserted into the through-hole 122 of the charging base 100, the first receiving end conductive structure 240 at the tip 220 comes into contact with the charging end conductive ring (such as the upper conductive ring 182 and the lower conductive ring 184 marked in FIG. 1A) inside the through-hole 122. The second receiving end conductive structure 250 located at one end of the body 210 comes into contact with the first charging end conductive structure 160 or the third charging end conductive structure 190, depending on the installation direction of the charging base 100. In this way, the charging base 100 charges the stylus 200.

Secondly, in an embodiment, the base 120 of the charging base 100 includes a built-in magnet. When the stylus 200 is inserted upright into the through-hole 122 of the charging base 100, the magnetic attraction generated by the base 120 helps to fix the stylus 200, to keep the stylus 200 in an upright state to facilitate charging.

Referring to FIG. 6A to FIG. 6D, the second usage manner is to insert the opening 212 at the body 210 of the stylus 200 into the charging base 100 in a horizontal direction, to fix the stylus 200 on a side of the electronic device 10, to facilitate carrying.

Also referring to FIG. 1A, FIG. 1B, and FIG. 3, when the opening 212 of the body 210 of the stylus 200 is inserted into the charging base 100, the third receiving end conductive structure 262 in the opening 212 comes into contact with the extending portion 186 or 188 of the second charging end conductive structure 180 of the base 120 of the charging base 100, depending on the installation direction of the charging base 100. The fourth receiving end conductive structure 264 in the opening 212 comes into contact with the first charging end conductive structure 160 or the third charging end conductive structure 190, depending on the installation direction of the charging base 100. In this way, the charging base 100 charges the stylus 200.

When the stylus 200 needs to be removed, the user presses the cap 290 to drive the clamping member 270, to disengage the buckle portion 272 of the clamping member 270 from the buckle groove 124 on the base 120. In this way, the stylus 200 is removed from the charging base 100.

In summary, the charging base of the disclosure is designed to enable a user to choose to insert the stylus upright into the charging base for charging, or insert the stylus into the charging base for charging through an opening on the body of the stylus, so as to adapt to different usage states of the user. In an embodiment, when continuing using the stylus, the user adopts the usage manner of inserting the stylus upright into the charging base. When needing to move the electronic device, the user adopts the usage manner of horizontally inserting the stylus into the charging base through the opening on the body. In this way, in addition to being convenient for the user to access, the stylus can be charged, which meets different usage requirements of the user.

The present disclosure has been disclosed above with the embodiments but is not limited thereto. A person skilled in the art may make some modifications and embellishments without departing from the spirit and scope of the present disclosure. Therefore, the scope of protection of the present disclosure should be defined by the claims.

What is claimed is:

1. A charging base, applied for electrically connecting to an electronic device and charging a stylus, the charging base comprising:

a base, comprising a through-hole;

a connector, disposed on one side of the base and used for being electrically connected to the electronic device;

a first charging end conductive structure, formed on an upper surface of the base and electrically connected to the connector; and a second charging end conductive structure, formed in the through-hole and electrically connected to the connector;

wherein the first charging end conductive structure and the second charging end conductive structure are used as a positive electrode and a negative electrode respectively;

wherein the first charging end conductive structure and the second charging end conductive structure are two separated conductive structures;

wherein the through-hole extends longitudinally through the base;

wherein the stylus comprises a body, a tip, and a battery, and the body has an opening; and wherein the first charging end conductive structure and the second charging end conductive structure are used as a charging interface by selectively inserting the base into the opening or the tip into the through-hole to charge the battery of the stylus.

2. The charging base according to claim 1, wherein the second charging end conductive structure extends from the through-hole to the upper surface.

3. The charging base according to claim 2, wherein the upper surface comprises a first groove, and the second charging end conductive structure extends from the through-hole to the first groove.

4. The charging base according to claim 1, further comprising a third charging end conductive structure formed on a lower surface of the base, wherein the third charging end conductive structure is electrically connected to the first charging end conductive structure.

5. The charging base according to claim 4, wherein the second charging end conductive structure extends from the through-hole to the lower surface.

6. The charging base according to claim 5, wherein the lower surface comprises a second groove, and the second charging end conductive structure extends from the through-hole to the second groove.

7. The charging base according to claim 1, wherein two opposite sides of the base are each provided with a buckle groove.

8. The charging base according to claim 1, wherein the connector is a universal serial bus connector.

9. The charging base according to claim 1, wherein the second charging end conductive structure comprises a charging end conductive ring.

10. The charging base according to claim 1, wherein the base comprises a built-in magnet.

* * * * *